United States Patent
Chen et al.

(10) Patent No.: US 11,153,913 B2
(45) Date of Patent: Oct. 19, 2021

(54) RANDOM ACCESS PROCEDURE IN NEXT GENERATION WIRELESS NETWORKS

(71) Applicant: FG Innovation Company Limited, Tuen Mun (CN)

(72) Inventors: Hung-Chen Chen, Hsinchu (TW); Mei-Ju Shih, Hsinchu (TW); Chie-Ming Chou, Hsinchu (TW)

(73) Assignee: FG Innovation Company Limited, Tuen Mun (HK)

(*) Notice: Subject to any disclaimer, the term of this patent is extended or adjusted under 35 U.S.C. 154(b) by 178 days.

(21) Appl. No.: 16/573,146

(22) Filed: Sep. 17, 2019

(65) Prior Publication Data

US 2020/0100294 A1   Mar. 26, 2020

Related U.S. Application Data

(60) Provisional application No. 62/734,632, filed on Sep. 21, 2018.

(51) Int. Cl.
*H04W 74/08* (2009.01)
*H04W 80/02* (2009.01)
(Continued)

(52) U.S. Cl.
CPC ....... *H04W 74/0833* (2013.01); *H04L 5/0092* (2013.01); *H04W 36/08* (2013.01);
(Continued)

(58) Field of Classification Search
CPC ....... H04B 1/7075; H04B 1/76; H04L 5/0001; H04L 5/001; H04L 5/0048; H04L 5/0053; H04L 5/0055–0057; H04L 5/0092; H04L 5/0094; H04W 28/12; H04W 36/08; H04W 48/12; H04W 48/16; H04W 72/1284; H04W 72/1289; H04W 72/1294;
(Continued)

(56) References Cited

U.S. PATENT DOCUMENTS 10,681,738 B2 * 6/2020 Babaei .............. H04W 74/0833
2016/0277983 A1   9/2016 Kim et al.
(Continued)

FOREIGN PATENT DOCUMENTS

CN           102918914 A       2/2013

OTHER PUBLICATIONS

Huawei et al. Remaining issues in RACH Procedure 3GPP TSG RAN WG1 Meeting NR#3 R1-1715387 Sep. 21, 2017 (Sep. 21, 2017) section 4, figure 1.
(Continued)

*Primary Examiner* — Thomas R Cairns
(74) *Attorney, Agent, or Firm* — ScienBiziP, P.C.

(57) ABSTRACT

Some of the present implementations provide a method for a user equipment (UE) for performing a random access (RA) procedure. The method transmits, to a base station, an RA preamble. The method then receives, from the base station, an RA response (RAR) associated with the RA preamble, the RAR containing a media access control (MAC) payload. The MAC payload identifies a set of one or more uplink (UL) grants for the UE. The method selects a UL grant from the set of one or more UL grants identified by the MAC payload for transmitting an Msg3 to the base station.

10 Claims, 8 Drawing Sheets

(51) Int. Cl.
    *H04W 72/12*    (2009.01)
    *H04W 36/08*    (2009.01)
    *H04L 5/00*     (2006.01)
    *H04W 48/16*    (2009.01)
    *H04W 72/14*    (2009.01)

(52) U.S. Cl.
    CPC ....... *H04W 48/16* (2013.01); *H04W 72/1284* (2013.01); *H04W 72/14* (2013.01); *H04W 74/0808* (2013.01); *H04W 80/02* (2013.01)

(58) Field of Classification Search
    CPC ............. H04W 72/14; H04W 74/0808; H04W 74/0816–0825; H04W 74/0833; H04W 74/0841–0858; H04W 74/0866; H04W 80/02
    See application file for complete search history.

(56) References Cited

U.S. PATENT DOCUMENTS

| | | | | |
|---|---|---|---|---|
| 2020/0221499 A1* | 7/2020 | Hofstrom | .......... | H04W 74/0833 |
| 2020/0374921 A1* | 11/2020 | Li | ........................... | H04W 8/26 |
| 2021/0105822 A1* | 4/2021 | Hakola | ............... | H04W 72/046 |

OTHER PUBLICATIONS

Institute for Information Industry (III) RRC-MAC interaction for early data transmission 3GPP TSG-RAN WG2 Meeting#102 R2-1807499 May 25, 2017 (May 25, 2017) the whole document.

* cited by examiner

RANDOM ACCESS PROCEDURE IN NEXT GENERATION WIRELESS NETWORKS

CROSS-REFERENCE TO RELATED APPLICATION(S)

The present application claims the benefit of and priority to a provisional U.S. Patent Application Ser. No. 62/734,632, filed on Sep. 21, 2018, entitled "Enhanced Random Access Procedure for NR-U," (hereinafter referred to as "US75048 application"). The disclosure of the US75048 application is hereby incorporated fully by reference into the present application.

FIELD

The present disclosure generally relates to wireless communications, and more particularly, to performing a Random Access (RA) procedure in the unlicensed spectrum for the next generation wireless networks.

BACKGROUND

Listen Before Talk (LBT) is a mechanism used by a network node for determining whether a shared channel is available for radio transmissions (e.g., using Clear Channel Assessment (CCA)). In an LBT procedure, a transmitter must sense the channel before transmitting. If the channel is identified as being occupied, the LBT procedure fails and the transmission is suppressed. Some of the wireless networks, such as a Wi-Fi network, may leverage the LBT feature to allow the coexistence of multiple users (e.g., multiple nodes may share the same radio channel using the LBT feature). The $3^{rd}$ Generation Partnership Project (3GPP) uses a similar LBT scheme when leveraging an unlicensed band (e.g., 5 GHz) in combination with a licensed spectrum (e.g., to boost the performance of a user equipment). For example, the License Assisted Access (LAA) scheme uses carrier aggregation (e.g., in downlink) to combine the Long Term Evolution (LTE) in an unlicensed spectrum with the LTE in the licensed spectrum.

In New Radio (NR), an LBT mechanism may also be required prior to radio transmissions when operating in an unlicensed spectrum. Using an LBT mechanism in NR, however, may significantly increase the overall time for completing a contention-based Random Access (RA) procedure (since every message transmission in the RA procedure may have to pass an LBT procedure). Additionally, the RA procedure failure rate may increase even more if the selected unlicensed channel, or NR-U (unlicensed spectrum) operating bandwidth is busy (considering the fact that the NR-U operating bandwidth may reach multiples of 20 MHz). Therefore, there is a need in the industry for an enhanced and efficient RA procedure (e.g., for an unlicensed spectrum).

SUMMARY

The present disclosure is directed to performing an RA procedure in the unlicensed spectrum for the next generation wireless networks.

In a first aspect of the present application, a method for a UE for preforming an RA procedure is provided. The method comprises transmitting, to a base station, an RA preamble; and receiving, from the base station, an RA response (RAR) associated with the RA preamble, the RAR containing a media access control (MAC) payload that identifies a set of one or more uplink (UL) grants for the UE.

In an implementation of the first aspect, the MAC payload comprises a field for indicating whether more than one UL grant is included in the MAC payload.

In another implementation of the first aspect, when the set of uplink grants comprises a first UL grant and a second UL grant, the first UL grant is associated with a current bandwidth part (BWP) and the second UL grant is associated with another BWP identified by a field in the MAC payload.

Another implementation of the first aspect further comprises selecting a UL grant from the set of one or more UL grants identified by the MAC payload for transmitting an Msg3 to the base station.

Another implementation of the first aspect further comprises, before selecting the UL grant, determining that a listen-before-talk (LBT) procedure performed on the UL grant is successful.

In another implementation of the first aspect, when the set of uplink grants comprises a first UL grant and a second UL grant, the MAC payload comprises a first field identifying a first bandwidth part (BWP) associated with the first UL grant and a second field identifying a second BWP associated with the second UL grant.

Another implementation of the first aspect further comprises determining that the RA procedure has failed after receiving, at a MAC layer of the UE, a consecutive number of LBT failure indicators.

In another implementation of the first aspect, an LBT failure indicator comprises a power ramping suspend indicator sent by a physical layer of the UE.

Another implementation of the first aspect further comprises receiving, through broadcasting system information, a parameter that indicates a value for the consecutive number of LBT failure indicators.

Another implementation of the first aspect further comprises, after determining that the RA procedure has failed, at least one of: performing an LBT channel reselection procedure; barring an unlicensed cell on which the RA procedure is performed before performing a cell reselection procedure; barring all unlicensed cells before performing a cell reselection procedure;

and transitioning to an RRC Idle state.

In a second aspect of the present application, a method for responding to an RA request received from a UE is provided. The method comprises receiving, from the UE, an RA preamble for an RA procedure initiated by the UE; and transmitting, to the UE, a RAR associated with the RA preamble, the RAR containing a MAC payload that identifies a set of one or more UL grants for the UE.

An implementation of the second aspect further comprises populating a field in the MAC payload for indicating whether more than one UL grant is included in the MAC payload.

Another implementation of the second aspect further comprises, when the set of uplink grants comprises a first UL grant associated with a current BWP and a second UL grant, populating a field in the MAC payload for indicating another BWP with which the second UL grant is associated.

Another implementation of the second aspect further comprises receiving an Msg3 from the UE on one of the set of one or more UL grants selected by the UE.

Another implementation of the second aspect further comprises, when the set of uplink grants comprises a first UL grant and a second UL grant, populating (i) a first field in the MAC payload for identifying a first BWP associated with the first UL grant and (ii) a second field in the MAC payload for identifying a second BWP associated with the second UL grant.

Another implementation of the second aspect further comprises transmitting a parameter to the UE through broadcasting system information, the parameter for indicating to the UE a maximum number of consecutive LBT failure indicators to be received by a MAC layer of the UE before the UE determines that the RA procedure has failed.

In a third aspect of the present application, a UE comprising one or more non-transitory computer-readable media having computer-executable instructions for performing an RA procedure; and at least one processor coupled to the one or more non-transitory computer-readable media is provided. The at least one processor is configured to execute the computer-executable instructions to transmit, to a base station, an RA preamble, from the base station, a RAR associated with the RA preamble, the RAR containing a MAC payload that identifies a set of one or more UL grants for the UE.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
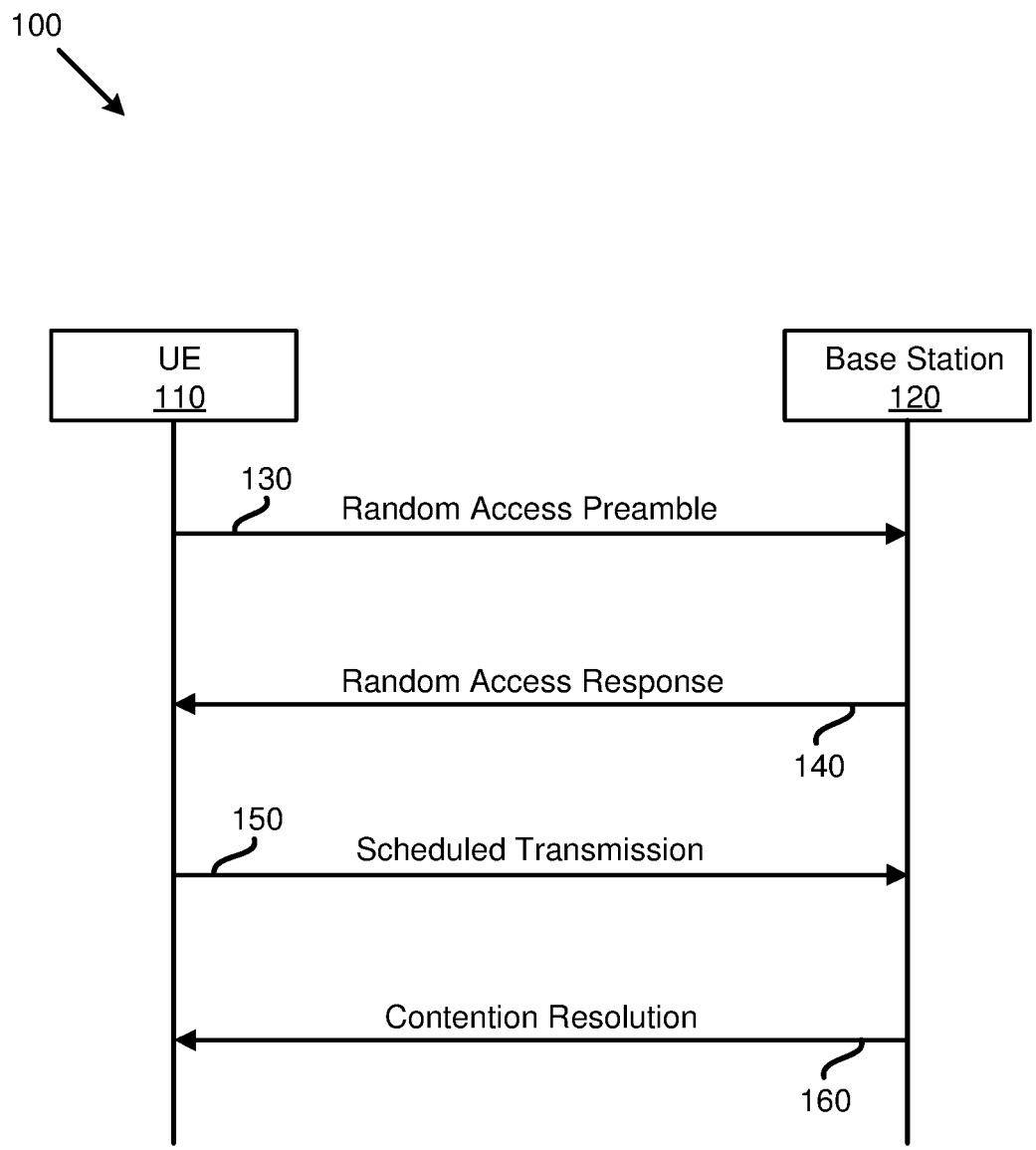
FIG. 1 is a diagram illustrating a contention-based Random Access (RA) procedure, according to one example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station may communicate with one or more UEs in the radio communication system through the plurality of cells. A cell may allocate sidelink (SL) resources for supporting Proximity Service (ProSe) or Vehicle to Everything (V2X) services. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

As described above, using the Listen Before Talk (LBT) feature in the NR may significantly increase the overall time for completing a contention-based Random Access (RA)

procedure, since every message transmission in the RA procedure may have to pass the LBT test (e.g., a Clear Channel Assessment (CCA) has to be performed and passed before each transmission of the RA procedure). To shorten the required time for completing a contention-based RA procedure and also to increase the RA success rate, some of the present implementations may provide an enhanced RA procedure in which one or more of the RA messages (e.g., Msg1, Msg2, Msg3, etc.) may be transmitted multiple times. That is, some of the present implementations may provide an enhanced RA procedure in which one or more resources may be granted (to the UE) for transmitting RA messages (e.g., Msg1, Msg3, etc.). For example, in some of the present implementations, a UE may receive (from a base station) multiple uplink (UL) grants in a RAR (e.g., for RA message transmissions). The UE may subsequently transmit one or more RA messages (e.g., multiple Msg3's) on one or more of the received UL grants provided by the base station (e.g., through one or more serving cells).

In addition, when a selected unlicensed channel/carrier, or NR-U operating bandwidth, is busy, a UE may behave differently (e.g., take additional action(s)), as described below, to avoid being trapped in an RRC Idle state (e.g., not being able to transition to an RRC Connected state). Moreover, in order to compensate for any potential increase in the power consumption (e.g., due to performance of an enhanced RA procedure), some aspects of the present implementations may provide (as discussed below) one or more triggering conditions for the UE to determine whether a normal RA procedure or an enhanced RA procedure is required when operating in an unlicensed spectrum.

FIG. 1 is a diagram 100 illustrating a normal contention-based RA procedure, according to one example implementation of the present application. FIG. 1 includes a UE 110, and a base station (e.g., a gNB) 120. As shown in the figure, the four-step contention-based random access procedure may start by the UE 110 sending, in action 130, a Random Access Preamble (Msg1) to the base station 120. The UE 110 may send the RA preamble to the base station 120 on a Physical Random Access channel (RACH) in the uplink. In response, in action 140, the base station 120 may send a Random Access Response (RAR) (Msg2) to the UE 110. The RAR may be generated by a Medium Access Control (MAC) entity and transmitted on a Downlink Shared Channel (DL-SCH).

The RAR, transmitted in action 140 may include an RA-preamble identifier, Timing Alignment information for the primary Timing Advanced Group (pTAG), initial UL grant, and assignment of Temporary Cell-Radio Network Temporary Identity (C-RNTI). After receiving the RAR, the UE 110 may send, in action 150, a first scheduled UL transmission (Msg3), for example, on an Uplink Shared Channel (UL-SCH) to the base station 120. After the base station 120 receives the first scheduled UL transmission, the base station may send, in action 160, a Contention Resolution message (Msg4) to the UE 130 on the DL.

In an RA procedure, upon receiving a RAR or Msg2 (e.g., in action 140), if the RAR contains a MAC sub-Protocol Data Unit (subPDU) with an RA preamble identifier that is associated with the transmitted preamble (e.g., when the identifier matches the preamble's index), the RAR reception may be considered as successful. After the UE determines that the RAR reception is successful, the MAC layer (e.g., in the UE) may indicate the received UL grant to the lower layers to transmit the Msg3 (e.g., in action 150). Once the Msg3 is transmitted, the MAC entity may start a timer (e.g., the ra-ContentionResolutionTimer) and restart the timer (e.g., the ra-ContentionResolutionTimer) at each Hybrid Automatic Repeat reQuest (HARM) retransmission (e.g., in the first symbol after the end of the Msg3 transmission). An RA procedure may be considered as successfully completed when the contention-resolution is successfully performed (e.g., when the UE Contention Resolution identity in the MAC Control Element (CE) matches the Common Control Channel (CCCH) Service Data Unit (SDU) transmitted in the Msg3, or other conditions defined in the 3GPP technical specification (e.g., TS 38.321) are met). However, if the timer (e.g., the ra-ContentionResolutionTimer) expires, the Contention-Resolution may be considered not successful if none of the successfully completed conditions (e.g., matching of the UE identifiers, or other conditions defined in the 3GPP TS 38.321) is satisfied.

The Msg3 in an RA procedure may not be transmitted to the base station, for example, when an LBT procedure fails. Consequently, the above-mentioned contention-resolution timer may never start (e.g., the MAC entity may never start the timer). As a result, the UE that has initiated such an RA procedure may stay in action 150 for a long period and may not proceed to action 160 (of FIG. 1), or transition back to action 130 (e.g., to send another RA preamble to the base station). To avoid this type of situation, in some of the present implementations, the UE may perform an enhanced RA procedure. That is, the UE may transmit multiple Msg3's to the base station (e.g., on multiple UL grants provided by the base station).

In some of the present implementations, when a UE (e.g., a UE that is in an Idle state or an Inactive state) intends to perform an RA procedure to connect to a cell that operates on an unlicensed spectrum/frequency/channel, the UE may perform one of a normal RA procedure and an enhanced RA procedure. In some aspects of the present implementations, the UE may only perform an enhanced RA procedure when the UE attempts to connect to a cell (or base station) that operates on an unlicensed spectrum/frequency/channel. In some of the present implementations, a UE capable of operating on an unlicensed spectrum may indicate such a capability to the network (NW). In some of such implementations, the UE may indicate its capability upon receiving a request from the NW. Similarly, in some of the present implementations, a UE that is capable of performing an enhanced RA procedure may indicate such a capability to the NW (e.g., when requested by the NW).

An enhanced RA procedure, in some of the present implementations, may be an RA procedure that may provide multiple transmission opportunities for the RA message transmissions (e.g., for a preamble transmission, a RAR transmission, a connection (resume) request transmission, or a connection (resume) request response transmission, etc.). In some of the present implementations, when a UE performs an enhanced RA procedure (or a normal RA procedure) on an unlicensed spectrum, the UE may ignore the backoff indicator(s). In some other aspects of the present implementations, a UE may respond to the backoff indicator(s) received on a bandwidth part (BWP), a carrier, or a channel when the UE intends to transmit a preamble on the BWP, carrier, or channel again.

In some of the present implementations, in an RA procedure, a variable (e.g., the PREAMBLE_TRANSMISSION_COUNTER) may be used to count the number of preamble transmissions. In some of such implementations, if the variable reaches a particular number of transmissions (e.g., the PREAMBLE_TRANSMISSION_COUNTER=preambleTransMax+1), the MAC layer may indicate an RA problem to the upper layers. In some of the present implementations, the maximum number of RA preamble transmissions before declaring an RA failure (e.g., the preambleTransMax) may be configurable and/or predefined.

In some of the present implementations, at least two other parameters preambleTransMax_1 and preambleTransMax_2 may also be configured. In some of such implementations, if PREAMBLE_TRANSMISSION_COUNTER is less than preambleTransMax_1+1, the UE (or the MAC entity) may trigger a normal RA procedure. In some other aspects of the present implementations, if PREAMBLE_TRANSMISSION_COUNTER= preambleTransMax_1+1, the UE (or the MAC entity) may trigger an enhanced RA procedure, but if PREAMBLE_TRANSMISSION_COUNTER= preambleTransMax_2+1, the MAC layer may indicate an RA problem to the upper layers.

In some of the present implementations, a lower layer (e.g., a physical (PHY) layer) may provide an LBT failure indicator to the upper layers (e.g., the MAC layer) when the LBT (procedure) fails, for example, for an Msg3 transmission. In some other aspects of the present implementations, the lower layer may provide an LBT failure indicator to the upper layers when the LBT for one or more of the RA transmissions (e.g., Msg1, Msg3, etc.) fails. In some of such implementations the indicator for one type of RA transmission failure (e.g., for an Msg1 transmission) may be different than an indicator for another type of RA transmission failure (e.g., for an Msg3 transmission). In some of the present implementations, if the Physical Random Access Channel (PRACH) transmission is dropped, or if the LBT (procedure) for the Msg3 transmission fails, or if the power of the PRACH transmission is adjusted, a lower layer (e.g., the PHY layer) may provide a power ramping suspension indicator to the upper layers (e.g., to the MAC layer).

In some of the present implementations, if the PRACH transmission is dropped due to an LBT failure, or because of an RA procedure collision, a lower layer of the UE (e.g., the PHY layer) may send a power ramping suspension indicator to the higher layers. That is, in some of the present implementations, a UE may reuse the power ramping suspension indicator from the PHY layer to the MAC layer when the UE experiences an LBT failure (e.g., for a preamble transmission, for an Msg3 transmission, etc.). In some of the present implementations, when the UE adjusts the power in the PRACH transmission, the lower layer of the UE may send a power ramping suspension indicator to the higher layers.

In some of the present implementations, during a normal RA procedure, or an enhanced RA procedure, if the UE (e.g., the MAC layer) receives a consecutive number (k1) of LBT failure indicators from a lower layer (e.g., the PHY layer), the MAC layer may determine the RA procedure has failed and may indicate an RA problem to the higher layers. The value of k1, in some of the present implementations, may be a fixed value, or may be configured by the network (e.g., via dedicated signaling or through broadcasting system information).

In some of the present implementations, when a UE performs a normal RA procedure, or an enhanced RA procedure, if the MAC layer receives the consecutive k1 LBT failure indicators from a lower layer (e.g., the PHY layer) when a particular variable (e.g., the PREAMBLE_TRANSMISSION_COUNTER) remains the same, or when the Synchronization Signal Bloc (SSB) selected for the RA preamble transmission does not change (e.g., stays the same as the previous Random Access Preamble transmission), or when the Channel Status Information Reference Signal (CSI-RS) selected for the RA preamble transmission does not change (e.g., stays the same as the previous Random Access Preamble transmission), the MAC layer may indicate an RA problem to the upper layers. In some of the present implementations, the consecutive LBT failure indicators (e.g., received from the PHY layer) may be recalculated (i.e., start counting from 0) if the PREAMBLE_TRANSMISSION_COUNTER is changed, or the SSB selected for the RA preamble transmission is changed, or the CSI-RS selected for the RA preamble transmission is changed.

In some of the present implementations, the MAC layer may indicate to the upper layers an RA problem associated with a licensed spectrum or an unlicensed spectrum. In some of the present implementations, once the upper layers (of the UE) receive such an RA problem indication, the UE may perform one, or a combination, of the following actions. The UE may trigger a channel reselection procedure (or a BWP switch procedure) when the UE receives the RA problem. For example, an LBT channel in NR-U may be in units of 20 MHz. A UE may measure the energy level of each detectable LBT channel and select a satisfied LBT channel (e.g., an LBT channel with a satisfying energy level). In some aspects of the present implementations, once the upper layers of the UE receive the RA problem indication, the UE may bar the unlicensed cell. That is, the UE may exclude the unlicensed cell as a candidate for cell selection/reselection, for example, for up to a certain time period that may be predefined (e.g., 300 seconds), or may be configurable. After the time period passes, the barred/unlicensed cell may be unbarred to become a suitable cell for a cell (re)selection procedure. In some of the present implementations, once the upper layers of the UE receive the RA problem indication, the UE may bar all of the unlicensed cells. That is, the UE may exclude all of the unlicensed cells as candidates for the cell selection/reselection, for example, for up to a fixed (or predefined) and/or a configurable time, and perform the cell (re)selection procedure thereafter. In some of the present implementations, for a UE that is in an Inactive state, if the upper layers of the UE receive the RA problem indication, the UE may transition to an Idle state.

In some of the present implementations, when a UE performs a normal RA procedure or an enhanced RA procedure, if there is a consecutive number (k2) of power ramping suspension indicators received from a lower layer (e.g., PHY layer), the MAC layer may determine the RA procedure has failed and may indicate an RA problem to the upper layers. The value of k2, in some of the present implementations, may be a fixed value, or may be configured by the network (e.g., via dedicated signaling or through broadcasting system information). In some of the present implementations, when a UE performs a normal RA procedure, or an enhanced RA procedure, when k2 consecutive power ramping suspension indicators are received from a lower layer (e.g., PHY layer) and the PREAMBLE_TRANSMISSION_COUNTER is the same, or when the SSB selected for the RA preamble transmission is not changed (i.e., stays the same as the previous Random Access Preamble transmission), or when the CSI-RS selected for the RA preamble transmission is not changed (i.e., stays the same as the previous RA Preamble transmission), the MAC layer may indicate an RA problem to the upper layers. In some of the present implementations, the consecutive power ramping suspension indicators received from the lower layer may be recalculated (i.e., start counting from 0) if the PREAMBLE_TRANSMISSION_COUNTER is changed, or the SSB selected for the RA preamble transmission is changed, or the CSI-RS selected for the RA preamble transmission is changed.

In some of the present implementations, if there is a consecutive number (k3) of LBT failure indicators received from the lower layers, for example in the contention resolution phase, the MAC layer may indicate an RA problem to the upper layers, or the MAC layer may consider that the contention resolution has failed. In some of the present implementations, during the contention resolution phase, if the MAC layer receives k3 consecutive Msg3 transmission drop indicators from the lower layers, the MAC layer may indicate an RA problem to the upper layers, or the MAC layer may consider that the contention resolution has failed. In some of the present implementations, when the Contention Resolution is considered not to be successful, the MAC layer (entity) may increase the value in a preamble transmission variable (e.g., the PREAMBLE_TRANSMISSION_COUNTER) by 1. In some of such implementations, if the PREAMBLE_TRANSMISSION_COUNTER=preambleTransMax+1, the MAC layer may indicate an RA problem to the upper layers. The value of k3 may be a fixed value or may be configurable by the NW (e.g., through broadcasting system information). In some of the present implementations, the received consecutive LBT failure indicators, or the received Msg3 transmission drop indicators may be recalculated (i.e., start counting from 0) if the PREAMBLE_TRANSMISSION_COUNTER is changed. In some of the present implementations, the lower layers (e.g., PHY layer) may send an Msg3 transmission drop indicator to the upper layers (e.g., the MAC layer) when a UL grant (e.g., indicated in the RAR) does not pass the LBT procedure (and as a result the Msg3 is not transmitted).

As discussed above, in order to compensate for any potential increase in the power consumption (e.g., due to performance of an enhanced RA procedure), some aspects of the present implementations may provide one or more triggering conditions for the UE to determine whether a normal RA procedure or an enhanced RA procedure is required when operating in an unlicensed spectrum. In some of the present implementations, based on a channel occupancy condition, a UE may determine whether to perform an enhanced RA procedure or not. For example, if the UE determines that the channel occupancy rate exceeds a threshold T1, the UE may perform an enhanced RACH procedure. A higher channel occupancy rate may imply that the channel is busier. The threshold T1 may be broadcast in the system information block or may be received via dedicated signaling, or may be a predefined value. In some of the present implementations, the channel occupancy rate may be calculated based on the Clear Channel Assessment (CCA) check result (or the LBT success rate) within a certain time period. In some of the present implementations, the channel occupancy rate may be calculated based on the energy level detected on a channel.

As another example for how a UE may decide whether to perform an enhanced RA procedure or a normal RA procedure, in some of the present implementations, the UE may be configured with two preamble index groups. One preamble index group may be for a normal RA procedure and the other preamble index group may be for an enhanced RA procedure. Based on the received preamble (or the preamble index), the network may differentiate whether a normal RA procedure or an enhanced RA procedure is initiated by the UE. Additionally, two RA resource pools may be configured, with one RA resource pool for a normal RA procedure and the other RA resource pool for an enhanced RA procedure. Based on the RA resource on which a preamble is transmitted, the network may differentiate whether a normal RA procedure or an enhanced RA procedure is initiated by the UE.

In some of the present implementations, based on one or more predefined rules, or configured rules, related to the establishment causes, or the resume causes, a UE may determine whether to perform an enhanced RA procedure or a normal RA procedure. The establishment causes may include, but are not limited to, emergency, high priority access, Mobile Terminating (MT) access, Mobile Originating (MO) signaling, MO data, MO voice call, MO Short Message Service (SMS), Multimedia Priority Service (MPS) priority Access, and MCS Priority Access. The resume causes may include, but are not limited to, emergency, high priority access, MT access, MO signaling, MO data, MO voice call, MO SMS, MPS priority Access, MCS Priority Access, and RAN notification Area Update. Based on the predefined rules (or the configured rules), the UE may be able to determine whether to perform an enhanced RA procedure, or a normal RA procedure, for an establishment cause or a resume cause. For example, in some of the present implementations, based on the given rules, for an emergency, high priority access, MPS priority Access, or MCS Priority Access establishment cause, or resume cause, a UE may perform an enhanced RA procedure. In some of such implementations, for any other establishment cause (or resume cause), the UE may only perform a normal RA procedure. The configuration rules may be broadcast in the system information block, or may be provided via dedicated signaling.

In some of the present implementations, based on the predefined rules (or configured rules), as well as a given establishment cause, or resume cause, the upper layers (e.g., the RRC layer) may send an indicator to the lower layers (e.g., the MAC layer) to indicate whether a normal RA procedure or an enhanced RA procedure is to be performed. In some of the present implementations, the upper layers may send a given establishment cause or resume cause to the lower layers. In some of such implementations, based on the predefined or configured rules related to the establishment cause, or the resume cause, the lower layers may determine whether to perform a normal RA procedure or an enhanced RA procedure.

In the 64 access categories defined in the 3GPP technical specification (e.g., TS 22.261), access categories 0 to 31 are reserved for standardization and access categories 32 to 63 are defined based on the operator classifications. In some of the present implementations, based on the predefined rules, or configured rules, a UE may determine whether to perform an enhanced RA procedure for an access category or a normal RA procedure. For example, based on the given rules, for access category 0 and access category 2, a UE may perform an enhanced RA procedure. For other access categories, the UE may only perform a normal RA procedure. The configured rules may be broadcast in system information block or may be provided via dedicated signaling in some of the present implementations. Additionally, in some of the present implementations, the upper layers (e.g., the RRC layer) may send a given access category to the lower layers (e.g., the MAC layer). In some of such implementations, based on the predefined rules or configured rules related to the access categories, the lower layers may determine whether to perform a normal RA procedure or an enhanced RA procedure.

In some of the present implementations, a UE may perform an enhanced RA procedure with an extended ra- ResponseWindow (which may be longer than an ra-ResponseWindow for a normal RA procedure), or an extended ra-ContentionResolutionTimer (which may be longer than an ra-ContentionResolutionTimer for a normal RA procedure). It should be noted that the ra-ResponseWindow may have an Msg2 (RAR) window length in number of slots. Once the RA Preamble is transmitted, the MAC entity may start the ra-ResponseWindow to receive the corresponding RAR message. If the ra-ResponseWindow expires but no RAR containing the RA Preamble identifiers that matches the transmitted PREAMBLE (based on its index) is received, the RA Response reception may be considered as unsuccessful. An extended ra-ResponseWindow, or an extended ra-ContentionResolutionTimer, in some of the present implementations, may be broadcast in the system information, or may be received via dedicated signaling (e.g., via an RRC Release message including the suspension configurations for transiting to an Inactive state), or may be a predefined value.

In some of the present implementations, a UE that performs an enhanced RA procedure may apply the extended ra-ResponseWindow, or the extended ra-ContentionResolutionTimer. In some of such implementations, a UE that performs a normal RA procedure may apply the regular ra-ResponseWindow, or the regular ra-ContentionResolutionTimer. In some of the present implementations, no ra-ResponseWindow is required for an enhanced RA procedure. In some of such implementations, if no qualified RAR received after N successful preamble transmission, the MAC layer may indicate an RA problem to the upper layers. A qualified RAR, in some of the present implementations, may be a RAR that contains a MAC subPDU with RA Preamble identifier corresponding to the transmitted preamble (based on its index), or as defined in the 3GPP (e.g., in TS 38.321).

In some of the present implementations, a UE may perform an enhanced RA procedure with multiple RA preamble opportunities. That is, when an enhanced RA procedure is initiated, the UE (or the MAC layer of the UE) may select multiple RA resources for preamble transmissions based on the random access resource selection procedure (e.g., the procedure defined in the 3GPP TS 38.321 for the same RA pool or different RA pools). An RA pool may be defined with a set of preamble indices and/or PRACH occasions (e.g., in different frequency locations or time locations) based on the configurations broadcasting in the system information, or received via dedicated signaling. In some of the present implementations, an RA pool or an RA pool-related configuration may be associated with a BWP, a slot, a carrier, or a channel by linking to the corresponding identity (e.g., a BWP Identity, a carrier Identity or a Channel Identity).

In some of the present implementations, the BWP Identity, the carrier Identity, or the Channel Identity that may be used for an enhanced RA procedure may be broadcast in the system information, or may be provided via dedicated signaling. In some of the present implementations, different types of UEs, or different categories of UEs, may be configured to use different RA pools. In some of the present implementations, when multiple Msg1 transmissions is adopted (or an enhanced RA procedure is initiated), the UE may monitor, at least, the PDCCH(s) of the different BWPs, different slots, different carriers, or different channels on which multiple Msg1 are transmitted, to receive the corresponding RAR. It should be noted that, it is not necessary for the UE to use the same preamble index for multiple Msg1 transmissions. For example, if a UE successfully transmits Msg1 on BWP #1 and BWP #2, the UE may need to monitor the Physical Downlink Control Channel (PDCCH) (or Control Resource Set) located on BWP #1and the PDCCH (or Control Resource Set) located on BWP #2 for receiving the corresponding RAR(s).

In some of the present implementations, when multiple Msg1 transmission is adopted (or an enhanced RA procedure is initiated), the UE may monitor the PDCCH(s) of the different BWPs, different slots, different carriers, or different channels configured for performing an enhanced RA procedure. For example, for an enhanced RACH procedure, the network may configure the RA resource on BWP #1 (which may be an initial BWP in Idle mode or Inactive mode), and the additional RA resources on BWP #2 and BWP #3. This way, if a UE only transmits Msg1 on BWP #1 and BWP #2, the UE may still need to monitor the PDCCH (or Control Resource Set) located on BWP #1, the PDCCH (or Control Resource Set) located on BWP #2, and the PDCCH (or Control Resource Set) located on BWP #3 for receiving the corresponding RAR(s). The network may configure multiple RA resources on different BWPs, different slots, different carriers, or different channels (but not limited to) by broadcasting in system information block or via dedicated signaling.

In some of the present implementations, a UE that has initiated an enhanced RA procedure may receive all of the possible RAR(s) until a particular timer (e.g., the ra-ResponseWindow) expires. In some of the present implementations, once a contention resolution procedure is considered successful, the ra-ResponseWindow may stop (if the timer is still running) and the UE may stop receiving any more RAR(s). In some of the present implementations, once a first Msg3 is successfully transmitted, the ra-ResponseWindow may stop (if still running) and the UE may stop receiving additional RAR(s).

In some of the present implementations, for each successful preamble transmission (e.g., a preamble that passes the LBT procedure), if the associated ra-ResponseWindow expires but no corresponding RAR (e.g., a RAR that includes RA Preamble identifiers matching the transmitted preamble, e.g., based on its index) is received, the RAR reception may be considered as unsuccessful and the MAC entity may increase a counter (e.g., the PREAMBLE_TRANSMISSION_COUNTER) by 1. In some of the present implementations, for each associated ra-ResponseWindow, the length of the ra-ResponseWindow may be the same or different based on the configuration provided via system information or dedicated signaling. In some of the present implementations, for each successful preamble transmission (e.g., that passes the LBT procedure), if all the associated ra-ResponseWindow of all preamble transmissions expire, but no corresponding RAR is received, the RA Response reception may be considered as unsuccessful and the MAC entity may increase the PREAMBLE_TRANSMISSION_COUNTER by 1.

In some of the present implementations, for a group of successful preamble transmissions (e.g., that passes the LBT procedure), if the common ra-ResponseWindow (of the group) expires, but no corresponding RAR (e.g., a RAR that includes RA Preamble identifiers matching the transmitted preamble) is received, the RA Response reception may be considered as unsuccessful and the MAC entity may increase the PREAMBLE_TRANSMISSION_COUNTER by 1. For example, when the first preamble is transmitted and the associated ra-ResponseWindow starts, any following preamble transmitted within this ra-ResponseWindow may be considered as being in the same preamble group. That is, the MAC entity may increase the PREAMBLE- _TRANSMISSION_COUNTER by 1 when the ra-ResponseWindow of the first preamble expires and the RAR reception is not successful for the preamble group. In another example, when the first preamble is transmitted and the associated timer T2 starts, any following preamble transmitted before T2 expires may be considered as being in the same preamble group. That is, the MAC entity may increase the PREAMBLE_TRANSMISSION_COUNTER by 1 when the ra-ResponseWindow of the first preamble expires and the RAR Response reception is not successful for the preamble group. In some of the present implementations, a UE may not be allowed to transmit a preamble within the associated ra-ResponseWindow when the timer T2 is not running.

A typical Medium Access Control (MAC) RAR of a RAR message may have a fixed size and may include an R field, a Timing Advance Command field, a UL Grant field, and a temporary C-RNTI. The R field is one bit (or Reserved bit) and is set to "0" by default. The Timing Advance Command field indicates the index value for a TA used to control the amount of timing adjustment that the MAC entity has to apply. The size of the Timing Advance Command field is 12 bits. The UL Grant field indicates the resources to be used on the uplink. The size of the UL Grant field is 27 bits. The Temporary C-RNTI field indicates the temporary identity that is used by the MAC entity during Random Access. The size of the Temporary C-RNTI field is 16 bits.

Figure 2:
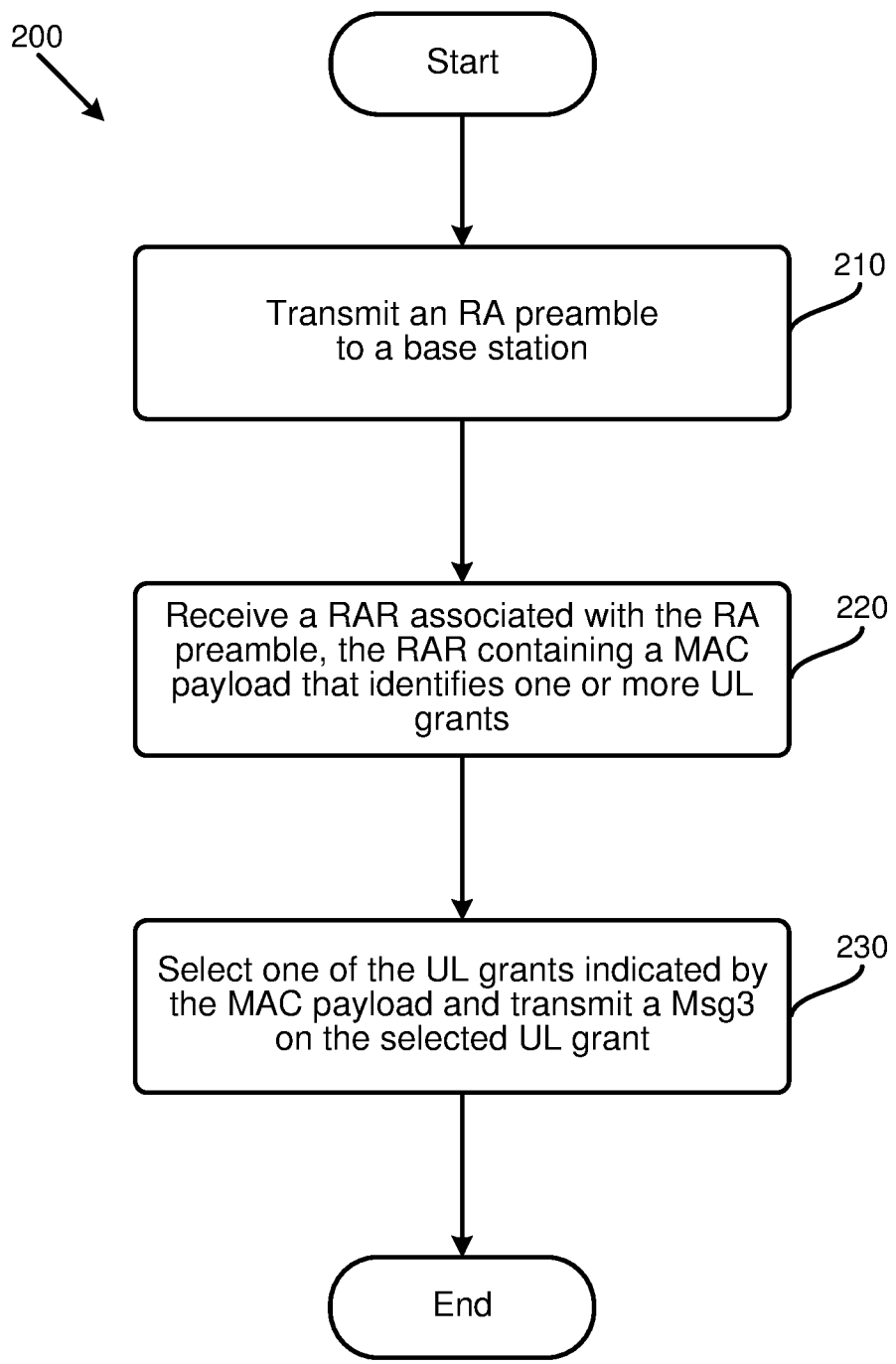
FIG. 2 is a flowchart illustrating a method (or process) performed by a UE to transmit one or more Msg3's on one or more uplink (UL) grants, according to an example implementation of the present application.

FIG. 2 is a flowchart illustrating a method (or process) 200 performed by a UE to transmit one or more Msg3's on one or more uplink (UL) grants, according to an example implementation of the present application. The process 200 may start in action 210 by transmitting an RA preamble (e.g., generated by a preamble index) to a base station (e.g., a gNB), for example, using a PRACH occasion. In some of the present implementations, the process may send the RA preamble to start an enhanced RA procedure.

After sending the RA preamble in action 210, the process may receive, in action 220, a RAR that may include, among other fields, a MAC subheader and a MAC payload. As described above, a RAR (which is a MAC PDU) may include one or more MAC subPDUs. A MAC subPDU may have a subheader part and a payload part. Some of the present implementations may use a payload part (may also be referred to as a MAC RAR hereinafter) of a MAC subPDU to identify one or more UL grants.

In some of the present implementations, the MAC subheader in the RAR may include an RA preamble identifier (e.g., RAPID) that is associated with the RA preamble index. That is, the RA preamble identifier may match the preamble index associated with the preamble for the UE to determine that the received RAR is associated with the send preamble. The MAC payload (or MAC RAR) may include one or more fields for identifying a set of one or more UL grants for the UE to use to send one or more Msg3's.

In action 230, the process 200 may select one of the UL grants indicated in the MAC payload (or MAC RAR) for transmitting the Msg3. The process may then end. In some of the present implementations, the process 200 may select one of the UL grants and then performs an LBT procedure for the selected UL grant. If the UL grant passes the LBT procedure, the process 200 may transmit the Msg3 using a component carrier (or BWP) indicated by the UL grant. If the LBT procedure is not successful, the process 200 may select the next UL grant indicated in the MAC RAR and perform the LBT procedure on the next selected UL grant. In some aspects of the present implementations, when the process 200 selects an UL grant that passes the LBT procedure and sends an Msg3 to the base station using the selected UL grant, the process may ignore the rest of UL grants indicated by the MAC RAR. In some aspects of the present implementations, however, if the process 200 receives more than one UL grants, the process may transmit an Msg3 for each of the UL grants (if each selected UL grant passes the LBT procedure) and monitor the component carriers (or BWPs) on which the Msg3 is transmitted for receiving an Msg4.

Figure 3:
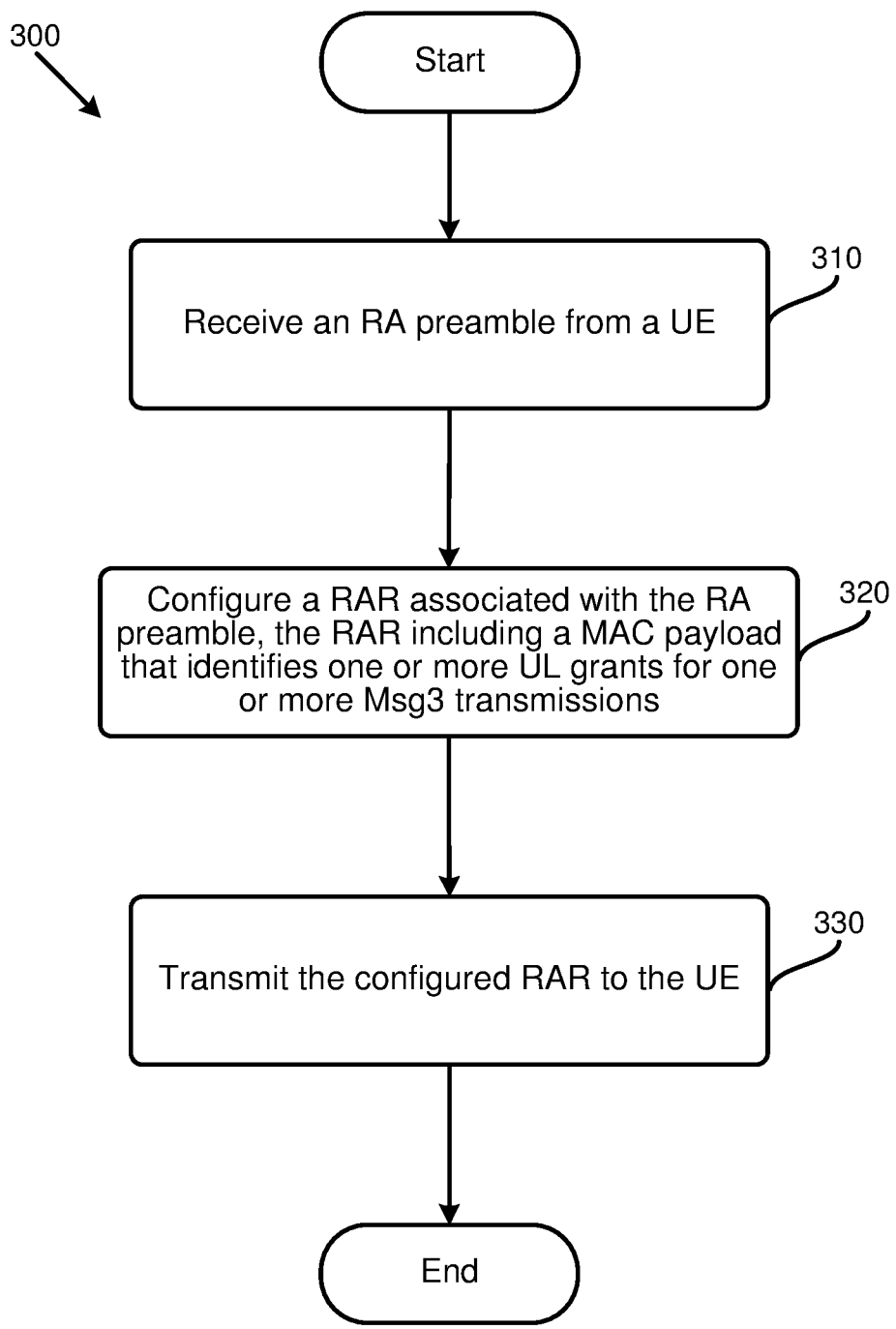
FIG. 3 is a flowchart illustrating a method (or process) performed by a base station to configure and transmit an RA Response (RAR) to a UE for one or more Msg3 transmissions, according to an example implementation of the present application.

FIG. 3 is a flowchart illustrating a method (or process) 300 performed by a base station (e.g., a gNB) to configure and transmit a RAR to a UE for multiple Msg3 transmissions, according to an example implementation of the present application. The process 300 may start in action 310 by receiving an RA preamble, generated based on a preamble index, from a UE through a PRACH occasion. In some of the present implementations, the process may receive the RA preamble when the UE starts an enhanced RA procedure.

In response to the received RA preamble, the process 300 may configure, in action 320, a RAR that may include a MAC subheader and a MAC payload (or MAC RAR). In some of the present implementations, the MAC subheader in the RAR may include an RA preamble identifier that is associated with the RA preamble index associated with the received RA preamble. The MAC RAR may include one or more fields for identifying a set of one or more UL grants for the UE to use for one or more Msg3 transmissions.

In some of the present implementations, the MAC payload (or MAC RAR) may include a field (e.g., a one-bit field or a two-bit field) that may indicate whether the RAR is providing one UL grant or more than one UL grant. In some of the present implementations, if the MAC RAR provides more than one UL grant, this field may indicate the exact number of the UL grants. In some aspects of the present implementations, the MAC RAR may include another field that may indicate a BWP associated with each UL grant. For example, in some of the present implementations, when the MAC RAR includes two UL grants, this field may identify a second BWP associated with the second UL grant (because the first UL grant is associated with a current active BWP). In some other aspects of the present implementations, when the MAC RAR includes two or more UL grants, the MAC RAR may include one specific field to identify each BWP that is associated with a separate UL grant. For example, if the MAC RAR includes two UL grants, a first filed may identify a first BWP associated with the first UL grant, and a second field may identify a second BWP associated with the second UL grant. In action 330, the process 300 may transmit the configured RAR to the UE. The process may then end.

In some of the present implementations, as described above, the UE may receive more than one UL grants in the MAC payload of the RAR when performing an enhanced RA procedure. In some of the present implementations, a new field may be used (e.g., in the MAC RAR of the RAR) to indicate whether there is only one UL grant in the RAR or more than one UL grants. In some of the present implementations, another new field may also be used to indicate where each UL grant is located (e.g., when there are more than one UL grants). For example, in some of the present implementations, the new field may be a two-bit field to indicate in which carrier (or BWP) the respective UL grant is located. In some other aspects of the present implementations, the location identifier field may be more than two bits. The supporting carrier(s) and the related information (e.g., bandwidth, etc.) may be broadcast in system information block or may be delivered via dedicated signaling.

Based on the information of Msg3 PUSCH frequency resource allocation, the information of Msg3 PUSCH time resource allocation, and the information of the corresponding carrier and/or other information carried in the MAC payload, a UE may transmit the Msg3 using the allocated UL resource (e.g., when the LBT procedure for such a transmission is successful).

In some of the present implementations, if the NW receives a preamble on a BWP (or a carrier, or a channel) that is not the initial BWP (or a carrier, or a channel) indicated for the UE to send the preamble (e.g., via a higher layer parameter initialuplinkBWP), the NW may determine that the UE is performing an enhanced RA procedure and, as such, may decide to assign more than one UL grants to the UE using a corresponding RAR. In some of such implementations, if a preamble is transmitted on the initial BWP (or carrier, or channel), the NW may simply assign one UL grant in the corresponding RAR. In some other aspects of the present implementations, if a preamble is transmitted on the initial BWP (or carrier, or channel), the NW may assign more than one UL grants in the corresponding RAR. In some of the present implementations, when a UE performs a normal RA procedure and receives a RAR that indicates more than one UL grants, the UE may use the first UL grant for the Msg3 transmission and ignore the other UL grants.

In some of the present implementations, if there are more than one UL grants received in the MAC RAR(s), the UE may select one of the UL grants for transmitting the Msg3. For example, if a UE receives three UL grants for Msg3 transmission and only two UL grants pass the LBT procedure, the UE may select one of the two UL grants for the Msg3 transmission. In some of the present implementations, when the MAC layer receives a MAC RAR that includes two uplink grants, the MAC layer may indicate the two uplink grants to the PHY layer. In some of such implementations, the PHY layer may feedback to the MAC layer with one valid uplink grant (i.e., that has passed the LBT procedure) for the Msg3 transmission. In some other aspects of the present implementations, the PHY layer may feedback to the MAC layer with more than one valid UL grants. In some of such implementations, the MAC layer may then select one of the valid UL grants received from the PHY layer. After selecting a valid UL grant (or receiving the valid UL grant from the PHY layer), the MAC layer may generate a MAC PDU to transmit the Msg3 (based on the received valid uplink grant) and instruct the PHY layer to generate a transmission for the MAC PDU.

In some of the present implementations, if a UE receives more than one UL grants for the Msg3 transmission, the UE may randomly select one of the UL grants for the LBT procedure and Msg3 transmission. In some of such implementations, if the LBT procedure for the selected UL grant fails, the UE may iteratively select the next UL grant until the selected UL grant passes the LBT procedure. If the LBT procedure succeeds for the selected UL grant, the UE may perform the Msg3 transmission on the selected UL grant. In some of the present implementations, the UE may try to perform the LBT procedure for one of the UL grants the time domain resource of which is the earliest.

In some of the present implementations, when the Msg3 is transmitted, the UE may start a timer (e.g., the ra-ContentionResolutionTimer) associated with the transmitted Msg3, and start monitoring the PDCCH (or the Control Resource Set) of the BWP, slot, carrier, or channel on which the Msg3 is transmitted for contention resolution. Since the UE may only select one UL grant for the Msg3 transmission, only one ContentionResolutionTimer may be associated with the Msg3. In some of the present implementations, when the Msg3 is transmitted, the UE may start the ra-ContentionResolutionTimer associated with the transmitted Msg3 and monitor the PDCCH (or the Control Resource Set) of the BWP(s), slot(s), carrier(s), or channel(s) based on the configurations (e.g., configured for performing an enhanced RA procedure) received via system information, or dedicated signaling, for contention resolution.

In some of the present implementations, a UE may perform an enhanced RA procedure with multiple Msg3 transmissions, for example, when there are multiple UL grants received in the corresponding MAC RAR(s). In some of the present implementations, once an Msg3 is transmitted, the MAC entity may start the ra-ContentionResolutionTimer associated with the transmitted Msg3. The MAC entity may then restart the ra-ContentionResolutionTimer at each Hybrid Automatic Repeat Request (HARM) retransmission associated with the transmitted Msg3 in the first symbol after the end of the Msg3 transmission. In some of the present implementations, when the Msg3 is transmitted, the UE may start the ra-ContentionResolutionTimer associated with the transmitted Msg3 and monitor the PDCCH (or the Control Resource Set) of the BWP(s), slot(s), carrier(s), or channel(s) on which the received UL grants are located for contention resolution. The UE may monitor the PDCCH based on the configurations (e.g., configured for performing an enhanced RA procedure) received via system information, or dedicated signaling for contention resolution.

If one or more timers (e.g., every ra-ContentionResolutionTimer) corresponding to one or more transmitted Msg3's expire and no qualified response is received (e.g., the UE Contention Resolution Identity in the received MAC CE in the Msg4 does not match the CCCH SDU transmitted in the Msg3), the UE (or the MAC entity) may consider the contention resolution as not being successful. For example, if a UE successfully transmits three Msg3 on three different UL grants, the ra-ContentionResolutionTimer associated with each Msg3 may start after each transmission. If every ra-ContentionResolutionTimer associated with the three Msg3's expires and no qualified response is received, the UE (or the MAC entity) may consider the contention resolution has failed. In some of the present implementations, the value of the ra-ContentionResolutionTimer for different BWPs, different slots, different carriers, or different channels may be the same, or may be different, based on the configuration or broadcasting system information, or based on the predefined value(s).

In some of the present implementations, once an Msg3 is transmitted, the MAC entity may start the ra-ContentionResolutionTimer associated with the transmitted Msg3 and restart the ra-ContentionResolutionTimer at each HARQ retransmission associated with the transmitted Msg3 in the first symbol after the end of the Msg3 transmission. If one of the ra-ContentionResolutionTimer of all transmitted Msg3's expires and no qualified response is received, the UE (or the MAC entity) may consider the contention resolution is not successful. For example, if a UE successfully transmits three Msg3 on different UL grants, the MAC entity may start the ra-ContentionResolutionTimer associated with each Msg3. If the ra-ContentionResolutionTimer of one of the Msg3's expires before a qualified response is received, the UE (or the MAC entity) may consider the contention resolution as being not successful.

It should be noted that each MAC subPDU may include a MAC subheader with Backoff Indicator only, a MAC subheader with RAPID only (i.e., an acknowledgment for the SI request) and a MAC subheader with RAPID and MAC RAR. In some of the present implementations, when a UE performs an RA procedure on an unlicensed spectrum, the UE may ignore the backoff indicator. In some other aspects of the present implementations, a UE may pay react to the backoff indicator received on the BWP, carrier, or channel, for example, when the UE intends to retransmit the preamble on the BWP, carrier, or channel (again).

A MAC subheader with RAPID may include three header fields E/T/RAPID. The header field E or the Extension field is a flag indicating whether the MAC subPDU including this MAC subheader is the last MAC subPDU or not in the MAC PDU. The E field is set to "1" to indicate that at least one other MAC subPDU follows. The E field is set to "0" to indicate that the MAC subPDU including this MAC subheader is the last MAC subPDU in the MAC PDU. The header field T or the Type field is a flag indicating whether the MAC subheader contains a Random Access Preamble ID or a Backoff Indicator (BI). The T field is set to "0" to indicate the presence of a BI field in the subheader. The T field is set to "1" to indicate the presence of a Random Access Preamble ID field in the subheader (RAPID). The header RAPID or the Random Access Preamble IDentifier field identifies the transmitted Random Access Preamble. The size of the RAPID field is 6 bits. If the RAPID field in the MAC subheader of a MAC subPDU is associated with one of the Random Access Preambles configured for the SI request, the MAC RAR in the RAR is not included in the MAC subPDU.

Figure 4:
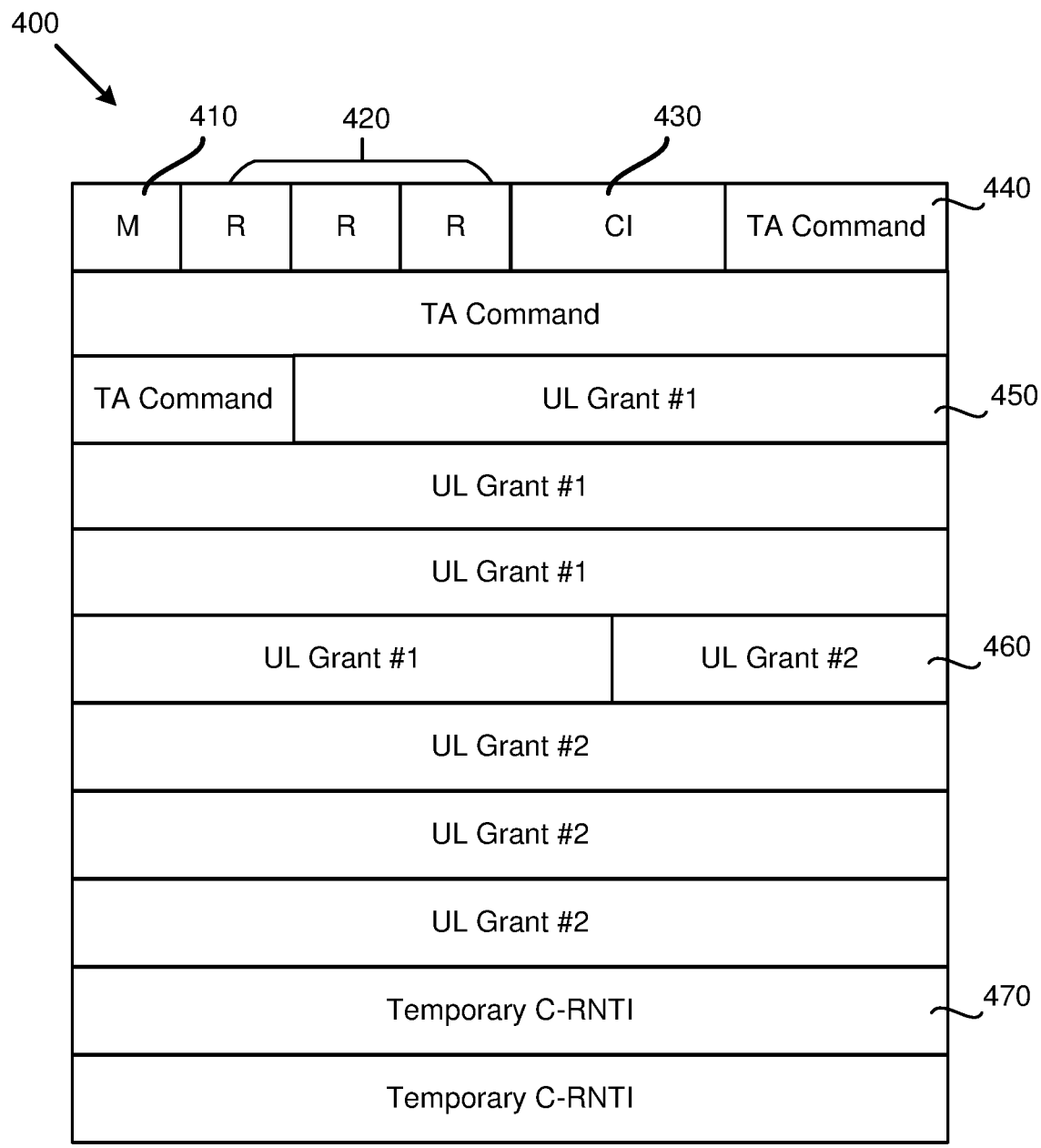
FIG. 4 is an example data structure for a medium access control (MAC) payload of a RAR, according to one example implementation of the present application.

FIG. 4 is an example data structure 400 for a MAC RAR of a RAR, according to one example implementation of the present application. The illustrated MAC RAR may support providing more than one UL grants for an Msg3 transmission. As shown in FIG. 4, the example MAC RAR of the RAR may be an octet aligned and may include an M field 410, multiple R fields 420, a Carrier Identity (CI) field 430, a Timing Advance (TA) Command field 440, a first UL grant field 450, a second UL grant field 460, and a Temporary Cell-Radio Network Temporary Identity (C-RNTI) field 470.

In some of the present implementations, the M field 410 may act as an indicator for indicating whether the RAR is providing one UL grant or more than one UL grants. In some of such implementations, if the M field 410 is set to "0", the MAC RAR may provide only one UL grant and if the M field 410 is set to "1", two (or more) UL grants may be allocated in the RAR. In some of the present implementations, when the M field 410 is "0", the size of the MAC RAR may be 56 bits and when the M field 410 is set to "1", the size of the MAC RAR may be 88 bits (or more). In some of the present implementations, the R fields 420 may be one or more reserved bits whit a default value of "0".

The CI field 430, in some of the present implementations, may indicate the Carrier Identity (or BWP ID) on which the second UL grant is located. In some of the present implementations, when the value assigned to the M field 410 is "0", the UE may ignore the value in the CI field. In these implementations, when the M field 410 is "0", the UE may use the current carrier (or BWP) for transmitting the Msg3. In some of the present implementations, the information/configuration of the carrier (or BWP) and its identity may be broadcast in the system information, or may be provided via dedicated signaling.

The TA Command field 440, in some of the present implementations, may indicate an index value the TA used to control the amount of timing adjustment that the MAC entity has to apply. The size of the Timing Advance Command field 440 may be 12 bits in some of the present implementations.

The UL grant fields 450 and 460 may indicate the resources used for uplink transmissions. The size of each of the UL grant fields 450 and 460 may be 27 bits in some of the present implementations. If the M field 410 is set to "0", only one UL grant field 450 may be included in the MAC RAR 400, and this UL grant may be located within the current carrier bandwidth. If the M field 410 is set to "1", however, in some of the present implementations, two UL Grant fields 450 and 460 may be included in the MAC RAR 400. In some of such implementations, the first UL grant may be located within the current carrier bandwidth and the second UL grant may be located within a carrier that is indicated by the CI field 430. In some of the present implementations, the Temporary C-RNTI field 470 may indicate a temporary identity that is used by the MAC entity during the Random Access. The size of the Temporary C-RNTI field 470, in some of the present implementations, may be 16 bits.

Figure 5:
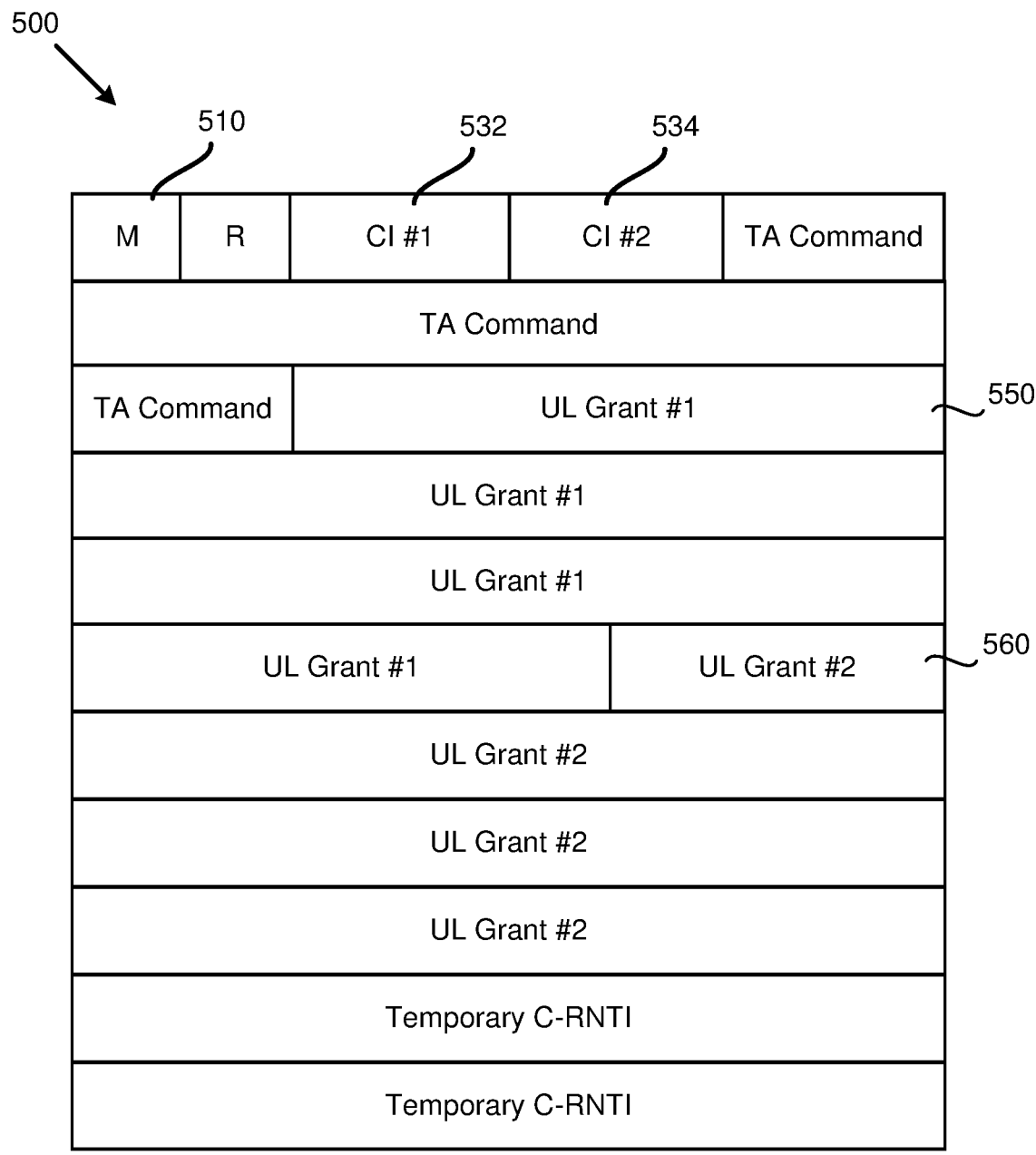
FIG. 5 is another example data structure for a MAC payload of the RAR, according to one example implementation of the present application.

FIG. 5 is another example data structure 500 for a MAC RAR of a RAR, according to one example implementation of the present application. As described above, in some of the present implementations, a MAC RAR may include a separate CI field for each UL grant. As shown in the FIG. 5, the example MAC RAR of the RAR may include an M field 510, a first CI field 532, a second CI field 534, a first UL grant 550, and a second UL grant 560.

In the illustrated example, the first CI field 532 may indicate the Carrier Identity on which the first UL grant 550 is located, and the second CI field 534 may indicate the Carrier Identity on which the second UL grant 560 is located. In some of the present implementations, when the M field 510 is "0", the UE may ignore both of the CI fields 532 and 534. Additionally, as described above with reference to FIG. 4, in some of the present implementations, when the M field 510 is set to "1", it is not necessary to allocate a separate UL grant within the current carrier bandwidth, and therefore, only one CI field is enough for showing the allocation of the second UL grant. Also, as described above, in some of the present implementations, the CI fields 532 and 534 may be used to indicate on which BWP (or slot, or channels) the associated UL grant is located. The information (or configuration) of the BWP (or slot, or channels) and its Identity may be broadcast in the system information, or may be provided through dedicated signaling.

In some of the present implementations, the M fields 410 and 510, shown in FIGS. 4 and 5, respectively, may have a bigger size in order for the MAC RAR to provide more than two UL grants (e.g., four or more UL grants). For example, in some of the present implementations, the M field in the MAC RAR of the RAR may be a two-bit field. Having two bits, in some of such implementations, may enable the MAC RAR to provide four uplink grants at the same time. For example, if the M field is set to "00", only one UL grant may be allocated. An M field having a "01" value may indicate that two UL grants are allocated. If the M field is set to "10", three UL grants may be allocated, and a value of "11" for the M field may indicate four UL grants being allocated in the MAC RAR.

In some of the present implementations, when the M field indicates multiple UL grants, the MAC RAR may include a corresponding CI filed and UL grant field for each of the UL grants indicated in the M field. For example, when a 2-bit M field indicates that four UL grants are provided, the MAC RAR of the RAR may include four separate CI fields and four separate UL grant fields.

Figure 6:
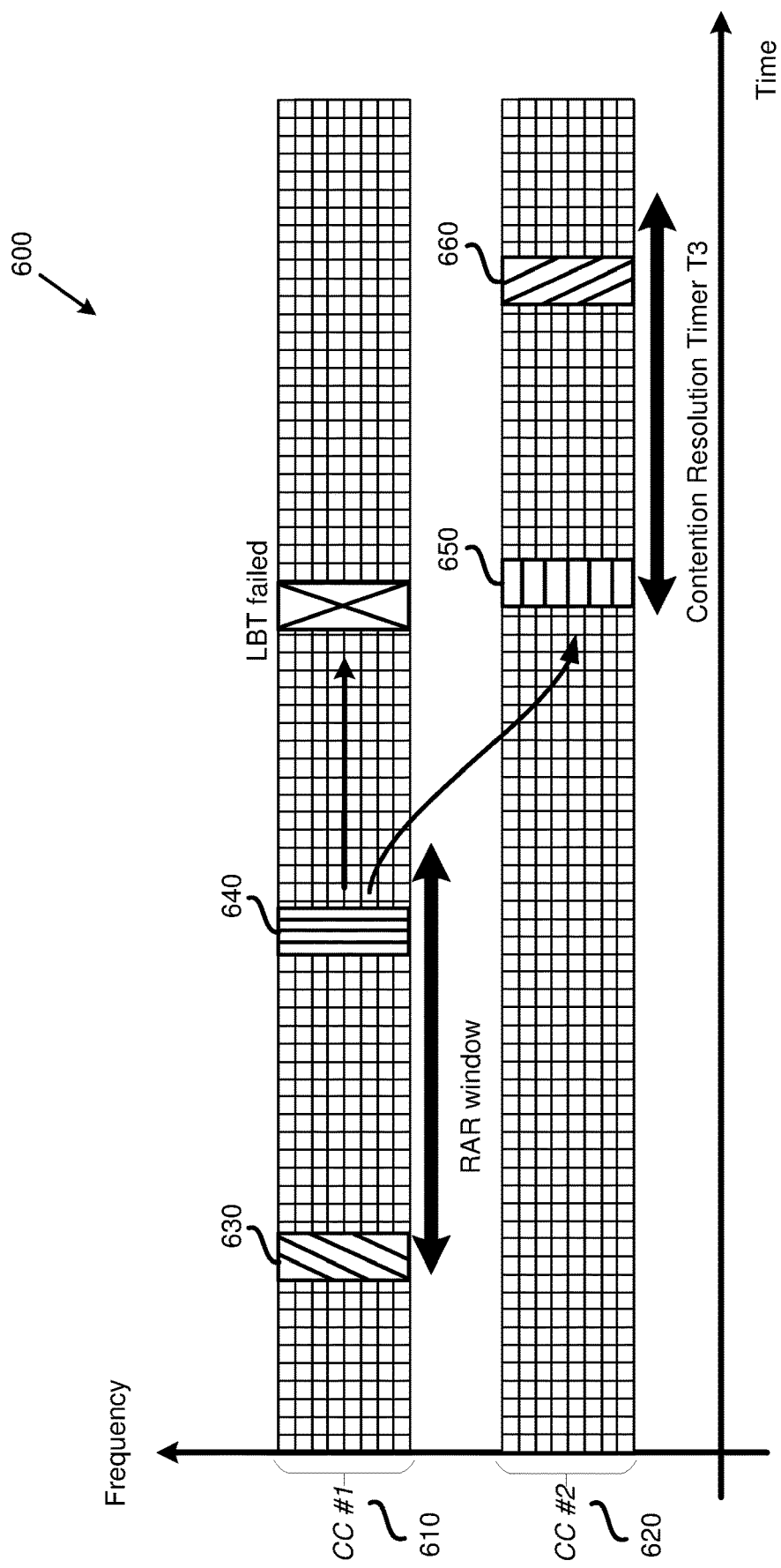
FIG. 6 is a time-frequency grid illustrating an example of different component carriers (or BWPs) providing multiple opportunities for transmission (and reception) of RA messages, according to an example implementation of the present application.

FIG. 6 is a time-frequency grid 600 illustrating an example of different component carriers providing multiple opportunities for transmission (and reception) of the RA messages (e.g., Msg1's and/or Msg3's), according to an example implementation of the present application. When a UE (not shown in the figure) initiates an RA procedure, the UE (or a MAC layer of the UE) may select an RA resource for a preamble transmission based on a random access resource selection procedure (e.g., the RA procedure defined in the 3GPP TS 38.321). In the illustrated example of FIG. 6, the UE, based on the common RACH configurations of Carrier 610 and Carrier 620, may perform random access resource selection procedures on the Carrier 610 and Carrier 620, independently. After the random access resource selection procedure, the UE may select an RA occasion for transmitting a preamble 630 (Msg1) on the Carrier 610.

After the preamble 630 is transmitted, the RAR window (e.g., ra-ResponseWindow) may start and the UE may start monitoring the PDCCH of the Carrier 610 for receiving a corresponding RAR for the preamble 630 as the response. As shown in the figure, the UE receives a corresponding RAR 640 (Msg2) within the RAR window on the Carrier 610. The UE may then use the UL grants indicated in the RAR for the Msg3 transmission. In the illustrated example, the RAR 640 received on the Carrier 610 may indicate two UL grants for Msg3 transmission on both of the Carriers 610 and 620. Since there are more than one UL grants received in the RAR 640, the UE may select one of the UL grants for transmitting the Msg3.

As shown in FIG. 6, although the UE has received two UL grants for the Msg3 transmission, only one of the UL grants passes the LBT procedure. That is, after the UE performs the LBT procedure on each of the Carriers 610 and 620 (for which the UL grants were provided), the UL grant on the Carrier 620 may only pass the LBT procedure. Therefore, the UE may select the UL grant on the Carrier 620 and transmit an Msg3 650 using this UL grant. Once the Msg3 650 is transmitted, the contention resolution timer T3 (e.g., ra-ContentionResolutionTimer) may start and the UE may monitor the PDCCH (or the Control Resource Set) of both of the Carriers 610 and 620 to receive an Msg4 for contention resolution.

In some other aspects of the present implementations, for receiving the Msg4, the UE may only monitor the PDCCH of a carrier through which the Msg3 is transmitted (e.g., in order to reduce the power consumption). In the above described example, once the UE selects the UL grant on the Carrier 620 for Msg3 transmission, in some of such implementations, the UE may only monitor the PDCCH (or the Control Resource Set) of the Carrier 620 to receive the Msg4 for contention resolution. In some aspects of the present implementations, once the UE selects the UL grant on the Carrier 620 for the Msg3 transmission, the UE may monitor the PDCCH (or the Control Resource Set) of the carrier(s) that is allowed to transmit the preamble in order to receive the Msg4 for contention resolution (e.g., Carriers 610 and 620 described below with reference to FIG. 6). In some other aspects of the present implementations, once the UE selects the UL grant on the Carrier 620 for the Msg3 transmission, the UE may monitor the PDCCH (or the Control Resource Set) of the carrier(s) that a UL grant is allocated for the Msg3 transmission.

In some of the present implementations, if the timer T3 expires and no qualified response is received on the monitored PDCCH's (e.g., the UE Contention Resolution Identity in the received MAC CE in the Msg4 does not match the CCCH SDU transmitted in the Msg3), the UE (or the MAC entity) may consider the contention resolution as not being successful. If the contention resolution is not successful, as described above, in some of the present implementations, the UE may increment the PREAMBLE_TRANSMISSION_COUNTER by 1. If the PREAMBLE_TRANSMISSION_COUNTER=preambleTransMax+1, the MAC layer may indicate an RA problem to the upper layers. Otherwise, the UE may perform the Random Access Resource selection procedure again. In the illustrated example, the UE receives an Msg4 660 within the time defined by the contention resolution timer T3.

In the Example illustrated in FIG. 6, the UE transmits the RA preamble only on one carrier (or BWP) even if multiple carriers are qualified for transmitting the RA preamble. For example, in some of the present implementations, a UE may transmit the RA preamble on the initial UL BWP or on the current active UL BWP (e.g., when multiple RA preamble transmission is not allowed). Additionally, irrespective of the LBT procedure for one of the UL grants failing (e.g., on the Carrier 610) in the above example, even if the LBT procedures for both UL grants passed, the UE may select only one of the qualified UL grants for the Msg3 transmission. In some other aspects of the present implementations, however, the UE may transmit multiple RA preambles on multiple carriers (or BWPs), as described below with reference to FIG. 7. Additionally, in some aspects of the present implementations, as described below with reference to FIG. 7, the UE may select all of the UL grants that are indicated to the UE for the Msg3 transmission.

Figure 7:
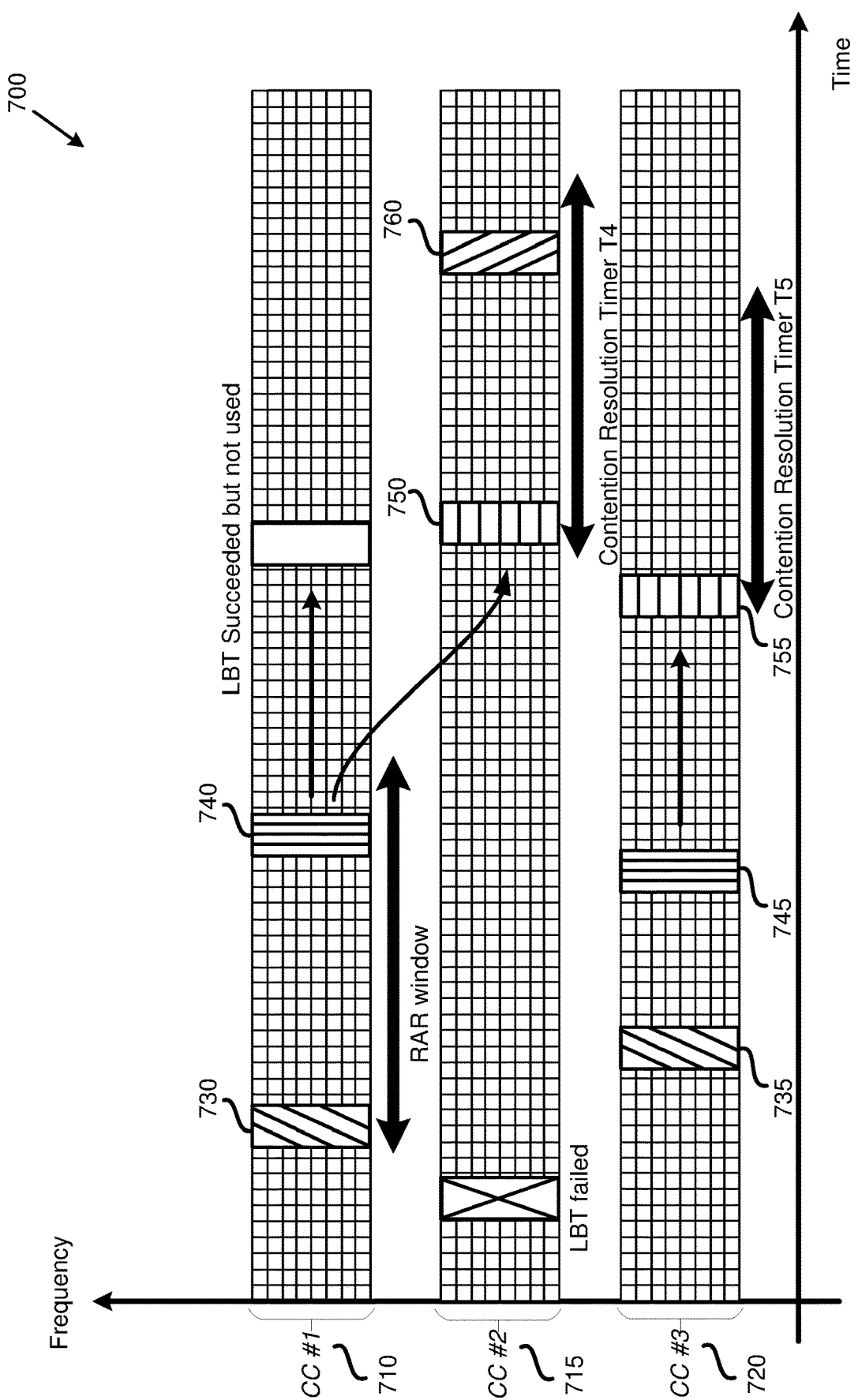
FIG. 7 is a time-frequency grid illustrating another example of different component carriers (or BWPs) providing multiple opportunities for transmission (and reception) of RA messages, according to an example implementation of the present application.

FIG. 7 is a time-frequency grid 700 illustrating another example of different component carriers providing multiple opportunities for transmission (and reception) of the RRC messages, according to an example implementation of the present application. In some of the present implementations, when an enhanced RA procedure is initiated, the UE (or its MAC layer) may select multiple RA resources for the preamble transmission based on random access resource selection procedure. In some of the present implementations, both of the selected multiple RA resources and the selected preambles on the selected RA resources may be different. In the illustrated example of FIG. 7, a UE (not shown) may be allowed to transmit multiple preambles on three Carriers 710, 715, and 720. Based on the common RACH configurations of the Carriers 710, 715, and 720, the UE may perform random access resource selection procedures on the Carrier 710, Carrier 715, and Carrier 720, independently. After the random access resource selection procedures are performed, the UE may select an RA occasion for transmitting preambles on each of the three carriers.

Based on the LBT procedure results, however, the preamble transmission on the selected RA occasion of the carrier 715 may be dropped. The UE may try to select another RA occasion for preamble transmission on the Carrier 715 later again. When the UE transmits the preambles 730 and 735 on the Carriers 710, and 720, respectively, the RAR window (e.g., ra-Response Window) for these preambles may start, and the UE may start monitoring at least the PDCCH(s) of the Carrier 710 and Carrier 720 for receiving the corresponding RARs as the responses. If both of the corresponding RAR messages are successfully received, the UE may use the UL grants indicated in the RAR(s) for the Msg3 transmission. For example, the RAR 740 received on the Carrier 710 may indicate two UL grants for the Msg3 transmission. On the other hand, a RAR 745 received on the Carrier 720 may indicate only one UL grant for the Msg3 transmission.

As shown in the figure, out of three UL grants provided to the UE, however, only two UL grants may pass the LBT procedure (i.e., the UL grant on the Carrier 710 has failed the LBT procedure). As a result, the UE may select both of the UL grants on the Carriers 715 and 7120 for the Msg3 transmission. Thar is, the UE may transmit an Msg3 750 on the Carrier 715 and transmit the Msg3 755 on the Carrier 720. Once the Msg3 750 is transmitted on the Carrier 715, the contention resolution timer T4 (e.g., ra-ContentionResolutionTimer) may start and the UE may start monitoring the PDCCH (or the Control Resource Set) of the Carrier 715 to receive an Msg4 760 for contention resolution. Similarly, once the Msg3 755 is transmitted on the Carrier 720, the contention resolution timer T5 (e.g., ra-ContentionResolutionTimer) may start and the UE may start monitoring the PDCCH (or the Control Resource Set) of the Carrier 720 in order to receive an Msg4 for contention resolution on this carrier as well. As shown in the figure, the UE has received the Msg4 760 within the time specified by the contention resolution timer T4, and as such the contention resolution on the carrier 715 is successful.

If all of the ra-ContentionResolutionTimers of each transmitted Msg3 expire and no qualified response is received (e.g., the UE Contention Resolution Identity in the received MAC CE in the Msg4 does not match the CCCH SDU transmitted in the Msg3), the UE (or the MAC entity) may consider the contention resolution as being not successful. If the contention resolution is not successful, the UE may increment the PREAMBLE_TRANSMISSION_COUNTER by 1. If PREAMBLE_TRANSMISSION_COUNTER=preambleTransMax+1, the MAC layer may indicate an RA problem to the upper layers. Otherwise, the UE may perform the Random Access Resource selection procedure again.

In the illustrated example, even though the contention resolution on the Carrier 715 is not successful, the contention resolution timer T5 for the Carrier 720 is still running to determine whether an Msg4 will be received on the Carrier 720 within the time specified by the timer T5. In some other aspects of the present implementations, however, when a contention resolution is successful on a carrier (e.g., the Carrier 715 in this example), other running contention resolution timer(s) (e.g., timer T5) may be stopped, and the UE may not require receiving any additional Msg4 on any other Carrier(s). For example, with reference to FIG. 7, when the UE receives the qualified Msg4 760 on the Carrier 715 and contention resolution is successful, both of the timers T4 and T5 may be stopped, and the UE may not need to keep receiving any other Msg4 transmitted on the Carriers 715 and 720.

Figure 8:
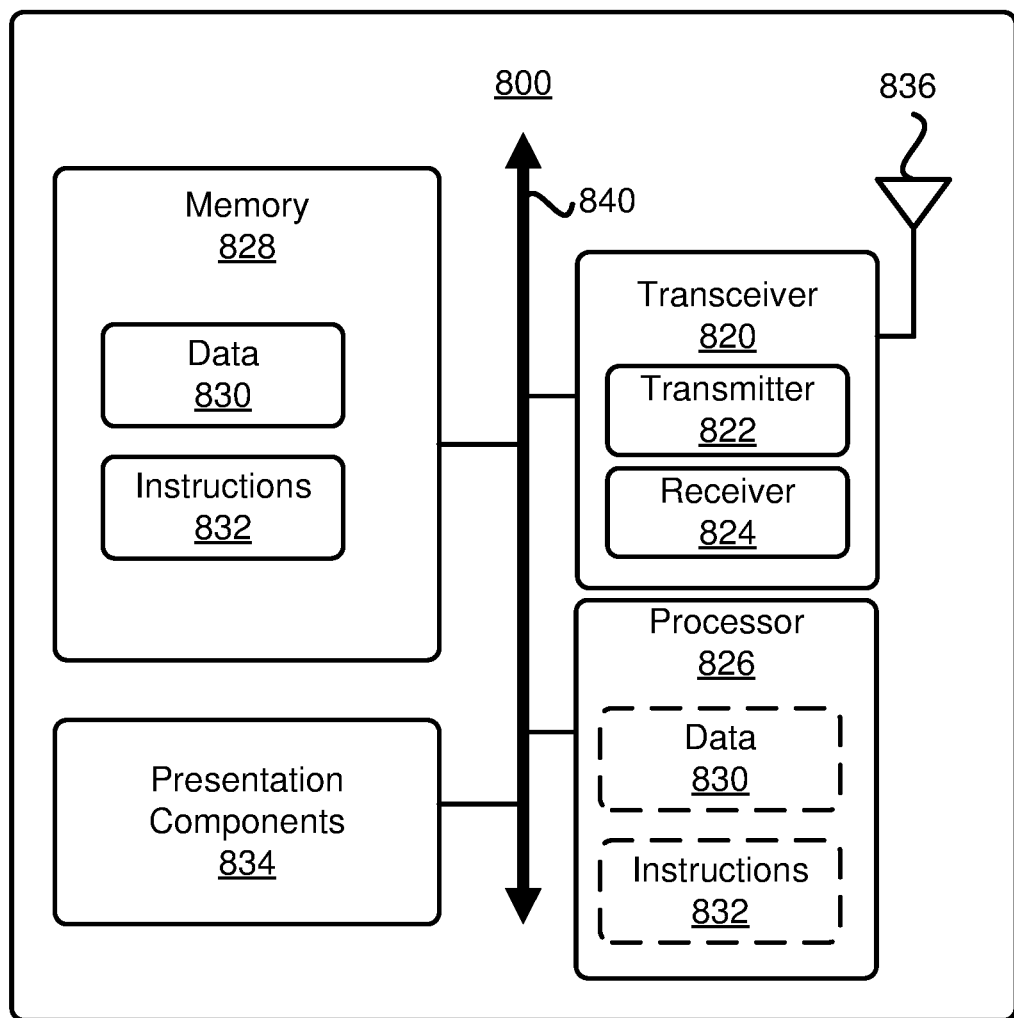
FIG. 8 illustrates a block diagram of a node for wireless communication, according to one example implementation of the present application.

FIG. 8 illustrates a block diagram of a node for wireless communication, according to one example implementation of the present application. As shown in FIG. 8, node 800 may include transceiver 820, processor 826, memory 828, one or more presentation components 834, and at least one antenna 836. Node 800 may also include a Radio Frequency (RF) spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control signalings.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Exemplary memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 8. Alternatively, instructions 832 may not be directly executable by processor 826 but be configured to cause node 800 (e.g., when compiled and executed) to perform various functions described herein.

Processor 826 may include an intelligent hardware device, for example, a central processing unit (CPU), a microcontroller, an ASIC, and etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 presents data indications to a person or other device. For example, one or more presentation components 834 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for performing a random access (RA) procedure, the method comprising:
   transmitting, to a base station, an RA preamble;
   receiving, from the base station, an RA response (RAR) associated with the RA preamble, the RAR containing a media access control (MAC) payload that identifies a set of one or more uplink (UL) grants for the UE;
   selecting, a UL grant from the set of one or more UL grants identified by the MAC payload for transmitting a scheduled UL transmission (Msg3) to the base station; and
   before selecting the UL grant, determining that a listen-before-talk (LBT) procedure performed on the UL grant is successful.

2. The method of claim 1, wherein the MAC payload comprises a field for indicating whether more than one UL grant is included in the MAC payload.

3. The method of claim 1, wherein when the set of uplink grants comprises a first UL grant and a second UL grant, the first UL grant is associated with a current bandwidth part (BWP) and the second UL grant is associated with another BWP identified by a field in the MAC payload.

4. The method of claim 1, wherein when the set of uplink grants comprises a first UL grant and a second UL grant, the MAC payload comprises a first field identifying a first bandwidth part (BWP) associated with the first UL grant and a second field identifying a second BWP associated with the second UL grant.

5. The method of claim 1 further comprising determining that the RA procedure has failed after receiving, at a MAC layer of the UE, a consecutive number of LBT failure indicators.

6. The method of claim 5, wherein an LBT failure indicator comprises a power ramping suspend indicator sent from a physical layer of the UE.

7. The method of claim 5 further comprising receiving, through broadcasting system information, a parameter that indicates a value for the consecutive number of LBT failure indicators.

8. The method of claim 5 further comprising, after determining that the RA procedure has failed, at least one of:
   performing an LBT channel reselection procedure;
   barring an unlicensed cell on which the RA procedure is performed before performing a cell reselection procedure;
   barring all unlicensed cells before performing a cell reselection procedure; and
   transitioning to an RRC Idle state.

9. A user equipment (UE) comprising:
   one or more non-transitory computer-readable media having computer-executable instructions for performing a random access (RA) procedure; and
   at least one processor coupled to the one or more non-transitory computer-readable media, and configured to execute the computer-executable instructions to:
   transmit, to a base station, an RA preamble;
   receive, from the base station, an RA response (RAR) associated with the RA preamble, the RAR containing a media access control (MAC) payload that identifies a set of one or more uplink (UL) grants for the UE;
   select a UL grant from the set of one or more UL grants identified by the MAC payload for transmitting a scheduled UL transmission (Msg3) to the base station; and
   before selecting the UL grant, determine that a listen-before-talk (LBT) procedure performed on the UL grant is successful.

10. The UE of claim 9, wherein the MAC payload comprises a field for indicating whether more than one UL grant is included in the MAC payload.

* * * * *